(12) United States Patent
Yoshino et al.

(10) Patent No.: US 9,408,146 B2
(45) Date of Patent: Aug. 2, 2016

(54) WIRELESS FIELD DEVICE AND POWER MANAGEMENT

(75) Inventors: Hiroki Yoshino, Tokyo (JP); Toshimitsu Uemura, Tokyo (JP); Kuniaki Sugitani, Tokyo (JP); Naoyuki Fujimoto, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 919 days.

(21) Appl. No.: 13/171,934

(22) Filed: Jun. 29, 2011

(65) Prior Publication Data

US 2012/0002605 A1 Jan. 5, 2012

(30) Foreign Application Priority Data

Jun. 30, 2010 (JP) ................ P2010-149710

(51) Int. Cl.
*H04W 52/02* (2009.01)
*H04L 12/24* (2006.01)
(52) U.S. Cl.
CPC ....... *H04W 52/0229* (2013.01); *H04L 41/0833* (2013.01)
(58) Field of Classification Search
CPC ......... H04L 41/0833; H04W 52/0245; H04W 52/0216
See application file for complete search history.

(56) References Cited

U.S. PATENT DOCUMENTS

| 2007/0258508 | A1* | 11/2007 | Werb et al. | 375/140 |
| 2009/0003214 | A1* | 1/2009 | Vaswani et al. | 370/236 |
| 2009/0168678 | A1* | 7/2009 | Han et al. | 370/311 |
| 2009/0224906 | A1 | 9/2009 | Balgard et al. | |

FOREIGN PATENT DOCUMENTS

| CN | 1825815 A | 8/2006 |
| CN | 101582895 A | 11/2009 |
| DE | 102009010730 A1 | 10/2009 |
| EP | 2096505 A1 | 9/2009 |
| JP | 2003-134030 A | 5/2003 |
| JP | 2003-134261 A | 5/2003 |
| JP | 2007288598 A | 11/2007 |
| JP | 2009-246833 A | 10/2009 |

OTHER PUBLICATIONS

Office action issued by the State Intellectual Property Office of the People's Republic of China dated Jul. 19, 2013 in corresponding Application No. 201110183285.3.
Japanese Office Action issued May 31, 2012 by the Japanese Patent Office in corresponding Application No. 2010-149710.
Communication dated Oct. 28, 2015 issued by European Patent Office in counterpart European Patent Application No. 11171621.3.

* cited by examiner

*Primary Examiner* — Jackie Zuniga Abad
(74) *Attorney, Agent, or Firm* — Sughrue Mion, PLLC

(57) ABSTRACT

A wireless field device that performs a wireless communication with other field devices in a wireless network through a gateway. The device includes: a battery incorporated in the field device to activate the field device; and a wireless communication module configured to exchange radio signals with the gateway to perform the wireless communication with said other field devices. When the field device starts procedure for joining in the wireless network, firstly, the wireless communication module continuously accesses the gateway in a first period to receive an advertisement signal from the gateway, and when the wireless communication module fails to receive the advertisement signal in the first period, the wireless communication module intermittently accesses the gateway until receiving the advertisement signal from the gateway.

3 Claims, 10 Drawing Sheets

FIG. 4

| STATE | EXPLANATION |
|---|---|
| DEEP SLEEP | ENTIRE FIELD DEVICE 20 IS INACTIVE. MPU 23 IS IN STANDBY STATE AND CAN BE ACTIVATED BY EXTERNAL INTERRUPT SIGNAL SUPPLIED FROM POWER MANAGEMENT UNIT 25 |
| START | FIELD DEVICE 20 IS PERFORMING ACTIVATION PROCESSING. |
| LONG WAIT | STATE IN WHICH TO JOIN NETWORK. THIS STATE CORRESPONDS TO PERIOD T3. |
| SLEEP | WIRELESS COMMUNICATION MODULE 22 IS INACTIVE BECAUSE FIELD DEVICE 20 COULD NOT JOIN NETWORK IN "SLEEP" STATE. THIS STATE CORRESPONDS TO PERIOD T4. |
| SHORT WAIT | WIRELESS COMMUNICATION MODULE 22 IS ACTIVE AND HENCE CAN RECEIVE ADVERTISEMENT. THIS STATE LASTS ONLY SHORT TIME T5 AFTER "SLEEP" STATE. |
| COMM | FIELD DEVICE 20 IS MAKING COMMUNICATION AFTER JOINING NETWORK. THIS STATE LASTS ONLY SHORT TIME Td. |

FIG. 5

| TRANSITION | SOURCE STATE | EVENT | OPERATION | DESTINATION STATE |
|---|---|---|---|---|
| S1 | DEEP SLEEP | INSERTION OF BATTERY OR RECEPTION OF INFRARED SIGNAL FROM INFRARED TRANSCEIVER 30 | FIELD DEVICE 20 AND WIRELESS COMMUNICATION MODULE 22 ARE ACTIVATED. | START |
| S2 | START | COMPLETION OF ACTIVATION PROCESSING | TIMER FOR MANAGEMENT OF PERIOD T3 IS STARTED. | LONG WAIT |
| S3 | LONG WAIT | RECEPTION OF ADVERTISEMENT BY WIRELESS COMMUNICATION MODULE 22 | WIRELESS COMMUNICATION MODULE 22 PERFORMS JOINING PROCESSING. | COMM |
| S4 | LONG WAIT | EXPIRATION OF SETTING TIME OF TIMER FOR MANAGEMENT OF PERIOD T3 WITHOUT RECEPTION OF ADVERTISEMENT BY WIRELESS COMMUNICATION MODULE 22 | WIRELESS COMMUNICATION MODULE 22 IS RENDERED INACTIVE AND TIMER FOR MANAGEMENT OF PERIOD T4 IS STARTED. | SLEEP |
| S5 | SLEEP | EXPIRATION OF SETTING TIME OF TIMER FOR MANAGEMENT OF PERIOD T4 | WIRELESS COMMUNICATION MODULE 22 IS ACTIVATED AND TIMER FOR MANAGEMENT OF PERIOD T5 IS STARTED. | SHORT WAIT |
| S6 | SHORT WAIT | RECEPTION OF ADVERTISEMENT BY WIRELESS COMMUNICATION MODULE 22 | WIRELESS COMMUNICATION MODULE 22 PERFORMS JOINING PROCESSING. | COMM |
| S7 | SHORT WAIT | EXPIRATION OF SETTING TIME OF TIMER FOR MANAGEMENT OF PERIOD T5 WITHOUT RECEPTION OF ADVERTISEMENT BY WIRELESS COMMUNICATION MODULE 22 | WIRELESS COMMUNICATION MODULE 22 IS RENDERED INACTIVE AND TIMER FOR MANAGEMENT OF PERIOD T4 IS STARTED | SLEEP |
| S8 | COMM | WIRELESS COMMUNICATION MODULE 22 DETERMINES THAT FIELD MODULE 20 HAS LEFT WIRELESS NETWORK. | TIMER FOR MANAGEMENT OF PERIOD T3 IS STARTED. | LONG WAIT |
| S10 | DEEP SLEEP | BATTERY 26 IS KEPT REMOVED AND NO INFRARED SIGNAL IS RECEIVED FROM INFRARED TRANSCEIVER 30. | "DEEP SLEEP" IS MAINTAINED. | DEEP SLEEP |
| S11 | LONG WAIT | WIRELESS COMMUNICATION MODULE 22 DOES NOT RECEIVE ADVERTISEMENT AND SETTING TIME OF TIMER FOR MANAGEMENT OF PERIOD T3 HAS NOT EXPIRED YET. | WIRELESS COMMUNICATION MODULE 22 CAN RECEIVE ADVERTISEMENT AND TIMER FOR MANAGEMENT OF PERIOD T3 IS DOING COUNTING OPERATION. | LONG WAIT |
| S12 | SLEEP | SETTING TIME OF TIMER FOR MANAGEMENT OF PERIOD T4 HAS NOT EXPIRED YET. | TIMER FOR MANAGEMENT OF PERIOD T4 IS DOING COUNTING OPERATION. | SLEEP |
| S13 | SHORT WAIT | WIRELESS COMMUNICATION MODULE 22 DOES NOT RECEIVE ADVERTISEMENT AND SETTING TIME OF TIMER FOR MANAGEMENT OF PERIOD T5 HAS NOT EXPIRED YET. | WIRELESS COMMUNICATION MODULE 22 CAN RECEIVE ADVERTISEMENT AND TIMER FOR MANAGEMENT OF PERIOD T5 IS DOING COUNTING OPERATION. | SHORT WAIT |
| S14 | COMM | ARRIVAL OF TRANSMISSION TIMING | MPU 23 PERFORMS CALCULATION PROCESSING AND WIRELESS COMMUNICATION MODULE 22 SENDS PROCESS DATA. | COMM |
| S20 | ANY | REMOVAL OF BATTERY 26 | ENTIRE FIELD DEVICE 20 IS RENDERED INACTIVE. | DEEP SLEEP |
| S21 | SLEEP OR SHORT WAIT | RECEPTION OF INFRARED SIGNAL FROM INFRARED TRANSCEIVER 30 | TIMER FOR MANAGEMENT OF PERIOD T3 IS STARTED. | LONG WAIT |

RELATED ART

WIRELESS FIELD DEVICE AND POWER MANAGEMENT

This application claims priority from Japanese Patent Application No. 2010-149710, filed on Jun. 30, 2010, the entire contents of which are herein incorporated by reference.

BACKGROUND

1. Technical Field

Embodiments described herein relate to a wireless field device.

2. Related Art

Conventionally, at places where a cable cannot be wired, for example, in water supply or sewer facilities such as manholes, a flowmeter that has a wireless communication function and serves as a wireless field device is attached to a pipe through which water flows.

In collecting data or inspecting a facility, a worker receives data from a flowmeter in a manhole, for example, by performing a wireless communication with the flowmeter using a hand-held terminal which serves as a wireless communication device.

Field devices include various devices having a communication function such as a pressure gauge, a differential pressure gauge, a thermometer, a level meter, and a flowmeter and devices such as a valve positioner that have a communication function and perform a measurement or control (valve positioner) that directly relates to a process. Field devices other than a valve positioner are called (industrial) transmitters.

Devices which receive a signal from such field devices and perform indication, recording, control, etc., such as an indicator, a recorder, an adjuster, a distributed control system device, an alarm device, etc. are system-side devices and are called receivers as opposed to the above-described concept of transmitters.

Assuming, as mentioned above, the use at places where ordinary wiring cannot be made, wireless field devices are of a battery-driven type. To enable the wireless field devices to operate for a long time, the wireless field devices are provided with a lithium battery as a power source.

FIG. 8 shows the system configuration of an example wireless network which uses such wireless field devices. As shown in FIG. 8, a wireless network topology 1 includes I/O devices 2-6, routing devices 7 and 8, and a gateway 9 and has a star-mesh configuration.

Each of the I/O devices 2-6 is a sensor such as a differential pressure gauge, a pressure gauge, or a thermometer or a manipulation end such as a valve positioner and has a wireless communication function as supported by IEEE 802.15.4.

The routing devices 7 and 8 have an advertisement function of issuing an advertisement to nearby devices on a regular basis and a routing function of sending route information and messages. Alternatively, the I/O devices 2-6 may be provided with the routing function.

The gateway 9 has a function of connecting the wireless network topology 1 and a plant network 10 and thus realizes connection between a control system 11 and the I/O devices 2-6.

In the example of FIG. 8, the I/O devices 2 and 3 can perform a wireless communication with the gateway 9 via the routing device 8 and the I/O devices 4-6 can perform a wireless communication with the gateway 9 via the routing device 7.

An I/O device 12 does not receive advertisements from the routing device 7 or 8 and does not belong to the wireless network topology 1. For example, such a situation occurs immediately after a time point when the I/O device 12 is powered on after power-on of the other I/O devices 2-6.

FIG. 9 is a sequence diagram which allows the I/O device 12 to join the wireless network topology 1. The sequence diagram of FIG. 9 is directed to a case that the I/O device 12 receives an advertisement from the routing device 8 and joins the wireless network topology 1 which complies with, for example, the wireless communication standard ISA 100.11a which utilizes IEEE 802.15.4.

Referring to FIG. 9, at step SQ1, the routing device 8 periodically sends, to nearby devices, an advertisement for urging them to join the wireless network topology 1. The I/O device 12, which has not joined the wireless network topology 1 yet, receives the advertisement sent from the routing device 8.

After receiving the advertisement, at step SQ2 the I/O device 12 sends, to the routing device 8, join requests that are directed to a system manager 91 and a security manager 92 provided in the gateway 9, respectively.

After receiving the join requests, at step SQ3 the routing device 8 transfers, to the system manager 91, the join request that is directed to the security manager 92.

After receiving the join request, at step SQ4 the system manager 91 transfers the join request to the security manager 92. The system manager 91 and the security manager 9 may be provided outside the gateway 9.

At step SQ5, the routing device 8 transfers, to the system manager 91, the join request that is directed to the system manager 91.

After the security manager 92 receives the join request, at steps SQ6-SQ8 a security join permission is finally communicated to the I/O device 12.

Furthermore, when the system manager 91 has received, from the I/O device 12, the join request directed to itself, at steps SQ9 and SQ10 a system manager join permission is finally communicated to the I/O device 12.

At step SQ11, the I/O device 12 sends a security confirm request to the system manager 91.

At step SQ12, the system manager 91 communicates the security confirm request to the security manager 92.

At step SQ13, the security manager 92 sends a security confirm response to the I/O device 12.

After completion of the procedure of FIG. 9, the I/O device 12 can send process data such as a differential pressure, a pressure, a temperature, or the like to the gateway 9 at a constant cycle. The constant cycle is a time interval (e.g., about 1 second to 1 hour) that can be set arbitrarily by the user.

Process data that has been transmitted to the gateway 9 is processed by the control system 11, whereby monitoring by the user is performed or a process control is performed by sending a wireless signal via the gateway 9 to an I/O device that is an operation terminal such as a control valve.

Each of the I/O devices 2-6 and 12, after joining in the wireless network topology 1, usually suspends the operation of the internal circuits to save energy consumption of the built-in battery. Each of the I/O devices 2-6 and 12 is activated at the constant cycle, that is, only when it is necessary to send process data. After sending of process data, the operation of each of the I/O devices 2-6 and 12 is suspended until the next calculation and sending of process data.

FIG. 10 is a graph showing an example current consumption characteristic of the I/O device 12 before and after joining in the wireless network topology 1. The horizontal axis represents time and the vertical axis represents the current consumption. The sequence process of FIG. 9 is executed in a period Ta that is from power-on of the I/O device 12 to completion of joining (indicated by a broken line). In the period Ta, the I/O device 12 is always kept operational to receive signals successively and hence the current consumption always has a large value Ia.

In a period Tb that starts from the completion of joining, the I/O device 12 is activated at a constant cycle T, that is, only when it is necessary to send process data. The I/O device 12 repeats a cycle of calculating and sending process data and then being kept inactive until the next calculation and sending of process data. In a period T1 of each cycle T, the I/O device 12 is kept inactive and the current consumption has a small value Ib (<Ia). In the other period T2, the I/O device 12 is operational to send process data. Each arrow denoted by symbol tp indicates that the I/O device 12 is sending process data to the gateway 9 by a wireless communication.

As can be seen from FIG. 10, after the completion of joining, the combination of the suspension period T1 in which the current consumption is Ib and the active period T2 in which the current consumption is Ia is repeated at the constant cycle T, and the suspension period T1 accounts for a large part of the cycle T. Therefore, the energy consumption of the battery can be reduced by elongating the constant cycle T.

JP-A-2003-134030 discloses a technique for adding a wireless communication function to a field device, and JP-A-2003-134261 discloses a communication system which uses field devices having a wireless communication function.

Incidentally, in constructing the wireless network shown in FIG. 8, the gateway 9 needs to be installed and activated first. However, because of delayed purchase of equipment, configuration of the plant network 10 or the control system 11, or some other reason, the gateway 9 may be installed after installation of the I/O devices 2-6 and 12 or the routing devices 7 and 8.

On the other hand, in general, field devices used as the I/O devices 2-6 and 12 and the routing devices 7 and 8 do not have a power-on/off switch outside the cabinet. This is because such field devices used in a dangerous atmosphere are required to have a pressure-resistant, explosion-proof structure. In general, such field devices are powered on/off by attachment/detachment of a battery.

Although it is conceivable to provide a switch inside the cabinet of a field device, opening the lid of the cabinet to turn on or off the switch is a burden to the user. It is not permitted to open the cabinet at a place where pressure resistance and explosion proof are required. Therefore, it is necessary to turn on the power switch or insert a battery immediately before installing a field device at an intended site.

As a result, in a state that the gateway 9 has not been installed yet, field devices used as the I/O devices 2-6 and 12 and the routing devices 7 and 8 have to wait for an advertisement (step SQ1 in FIG. 9) in the power-on state for a long time. That is, the state that the period Ta in which the current consumption has the large value Ia (see FIG. 10) continues until the gateway 9 is installed and activated.

In actual measurement examples, the current consumption in the period Ta is several tens of times the average current consumption in the period Tb (see FIG. 10) and one-day delay of installation of the gateway 9 results in consumption of energy that would be consumed in several months if the gateway 9 were installed. In battery-driven wireless field devices, the battery life is an important issue and the fact that the battery energy may be consumed in the state of the period Ta shown in FIG. 10 for a long time is a serious problem.

The same situation occurs when the gateway 9 has failed: A large amount of battery energy is consumed in field devices used as the I/O devices 2-6 and 12 and the routing devices 7 and 8 until completion of replacement of the gateway 9.

Powering on field devices after completion of installation or replacement of the gateway 9 is not practical for the following reasons. First, as mentioned above, the cabinet cannot be opened at a place where pressure resistance and explosion proof are required.

In a large plant, several hundreds or several thousands of field devices may be distributed. Powering on all the field devices after completion of installation or replacement of the gateway 9 not only increases personnel expenses but also increases, for example, the probability of occurrence of trouble due to scuffing of the lid of a cabinet and danger in a pressure-resistant area due to incomplete closure of a lid.

Even if a battery is inserted into place and the lid of its cabinet is closed in a safe area such as a user work bench area, the battery energy is consumed uselessly until a start of regular communications.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

Accordingly, it is an illustrative aspect of the present invention to provide a wireless field device whose battery life is elongated by reducing the current consumption before joining in a wireless network.

According to one or more illustrative aspects of the present invention, there is provided a wireless field device that performs a wireless communication with other field devices in a wireless network through a gateway. The device includes: a battery incorporated in the field device to activate the field device; and a wireless communication module configured to exchange radio signals with the gateway to perform the wireless communication with said other field devices. When the field device starts procedure for joining in the wireless network, firstly, the wireless communication module continuously accesses the gateway in a first period to receive an advertisement signal from the gateway, and when the wireless communication module fails to receive the advertisement signal in the first period, the wireless communication module intermittently accesses the gateway until receiving the advertisement signal from the gateway.

Other aspects and advantages of the present invention will be apparent from the following description, the drawings and the claims.

BRIEF DESCRIPTION OF THE DRAWINGS

FIG. 4 explains the details of the states shown in FIG. 3;

FIG. 5 explains the details of the state transitions shown in FIG. 3;

DETAILED DESCRIPTION OF EXEMPLARY EMBODIMENTS

Figure 1:
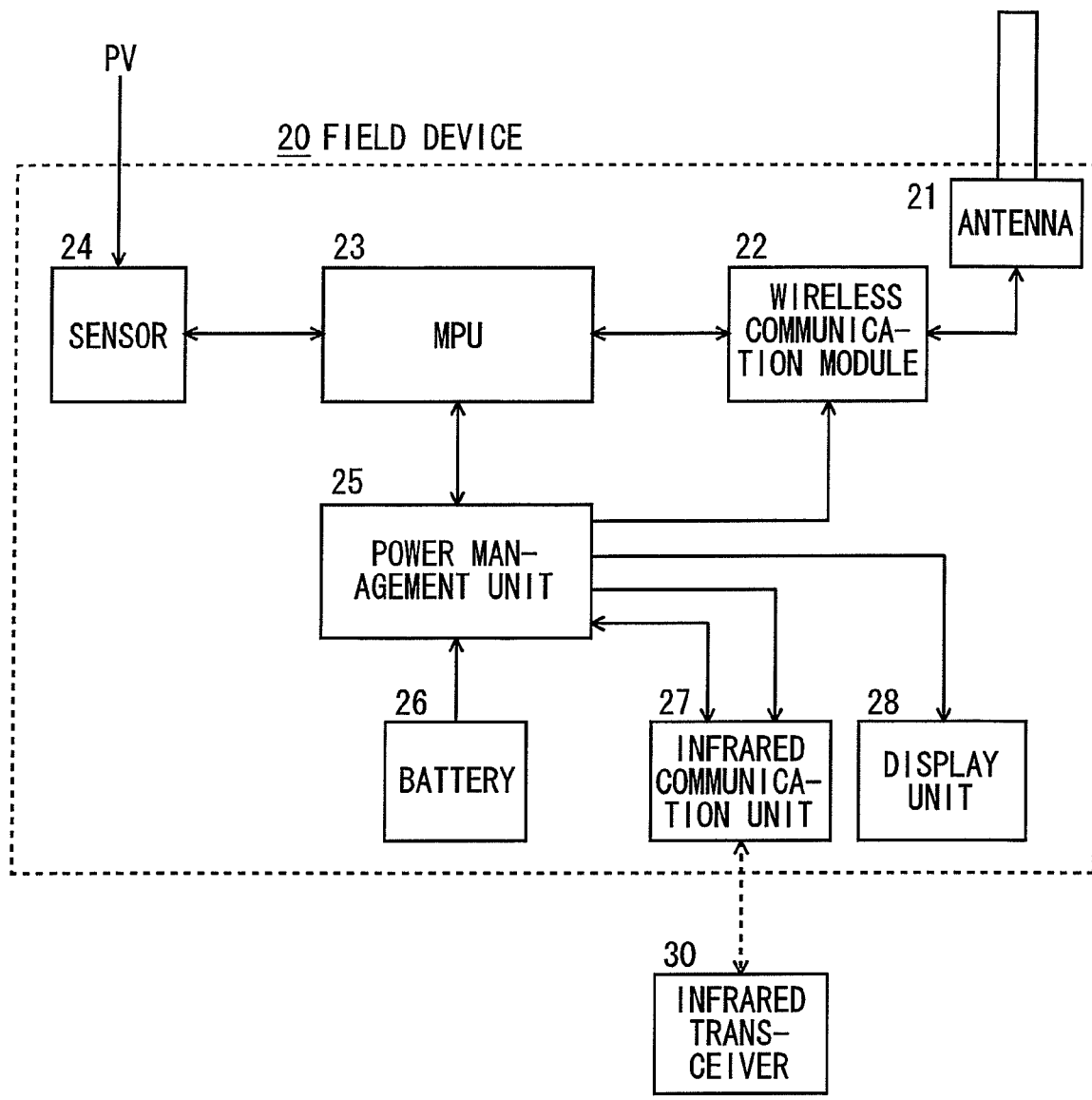
FIG. 1 is a block diagram of a wireless field device 20 according to an embodiment of the present invention.

Exemplary embodiments of the present invention will be hereinafter described with reference to the drawings. FIG. 1 is a block diagram of a wireless field device 20 according to an embodiment of the invention. As shown in FIG. 1, the wireless field device 20 includes an antenna 21, a wireless communication module 22, an MPU 23, a sensor 24, a power management unit 25, a battery 26, an infrared communication unit 27, a display unit 28.

For example, an infrared transceiver 30 is a field device setting tool incorporating an infrared transmitter and receiver, and performs an infrared communication with the infrared communication unit 27.

The wireless communication module 22 is configured to exchange radio signals with the gateway 9 (see FIG. 8) via the antenna 21. A reception result of the wireless communication module 22 can be communicated to the MPU 23. In accordance with the instruction from the MPU 23, the wireless communication module 22 can send failure information, a process value PV, etc. to the gateway 9.

The MPU 23, which is a central processing unit, has a computing unit such as a microprocessor and storage unit such as a RAM and an EEPROM. The MPU 23 converts, corrects, or converts into a user-specified scaling value such as a percentage value a process quantity PV such as a process pressure, temperature, or a flow rate of fluid in a pipe (not shown) detected by the sensor 24, and supplies a calculation result to the wireless communication module 22.

The MPU 23 receives a setting change request, for example, from the user by radio via the wireless communication module 22. The MPU 23 controls and diagnoses the individual internal units of the field device 20 and, if a problematic diagnosis result is obtained, informs the user of failure information etc. via the wireless communication module 22. Furthermore, the MPU 23 supplies diagnosis results and a calculation result of a process value PV to the display unit 28 and causes them to be displayed on the display unit 28.

The power management unit 25 regulates a power voltage that is supplied from the battery 26 and supplies a necessary voltage to the MPU 23.

The power management unit 25 supplies power to the individual internal units of the field device 20 every prescribed cycle by switching the power voltage by performing on it an on/off control that is determined by the CPU 23 according to an intermittent operation cycle time specified by the user.

Furthermore, the power management unit 25 also on/off-controls the supply of power to the individual internal units of the field device 20 according to a reception signal that is transmitted from the infrared communication unit 27.

The management functions of the power management unit 25 may be provided in the central processing unit of the MPU 23. As for the power management portion of the power management unit 25, waiting mode such as a power saving mode can be set. The power management unit can cause a transition to a standby state by itself after it has operated for a prescribed time. The standby state can be canceled when an external interrupt signal, for example, is received from the infrared communication unit 27, for example.

The battery 26, which is a lithium battery, for example, can be inserted into and removed from a prescribed portion inside the field device 20 by opening a lid (not shown).

The infrared communication unit 27 receives a signal from the infrared transceiver 30 through a glass cover (not shown), and supplies a reception result to the power management unit 25.

Capable of sending a signal to the infrared transceiver 30, the infrared communication unit 27 can send out a calculation result of a process value PV and a failure diagnosis result produced by the MPU 23 in place of the wireless communication module 22. The infrared communication unit 27 may be provided on the display unit 28.

The display unit 28 is an LCD, for example.

The user operates the infrared transceiver 30 to send, to the infrared communication unit 27, a setting signal for powering on or off the above-configured field device 20. The infrared communication unit 27 supplies the received power setting signal to the power management unit 25.

If being in a standby state, the power management unit 25 is activated by a setting signal supplied from the infrared communication unit 27, an external interrupt signal, or the like. If being in operation, the power management unit 25 receives a setting signal. According to a signal received from the infrared communication unit 27, the power management unit 25 stops the supply of power to the wireless communication module 22, the MPU 23, the sensor 24, and the display unit 28. The power management unit 25 turns on and off the supply of power to the infrared communication unit 27 at regular intervals (e.g., every 1 second) to allow it to detect infrared light.

When the supply of power to the wireless communication module 22 from the power management unit 25 is stopped, the wireless communication module 22 stops sending and receiving radio waves completely.

As mentioned above, when the battery 26 is removed from the field device 20, the supply of power to the power management unit 25 is shut off and the supply of power to the wireless communication module 22, the MPU 23, the sensor 24, and the display unit 28 is stopped. The field device 20 may be configured so that when the battery 26 is inserted, the power management unit 25 restarts supply of power to the wireless communication module 22, the MPU 23, the sensor 24, and the display unit 28 irrespective of reception of an on/off signal from the infrared communication unit 27.

Figure 2:
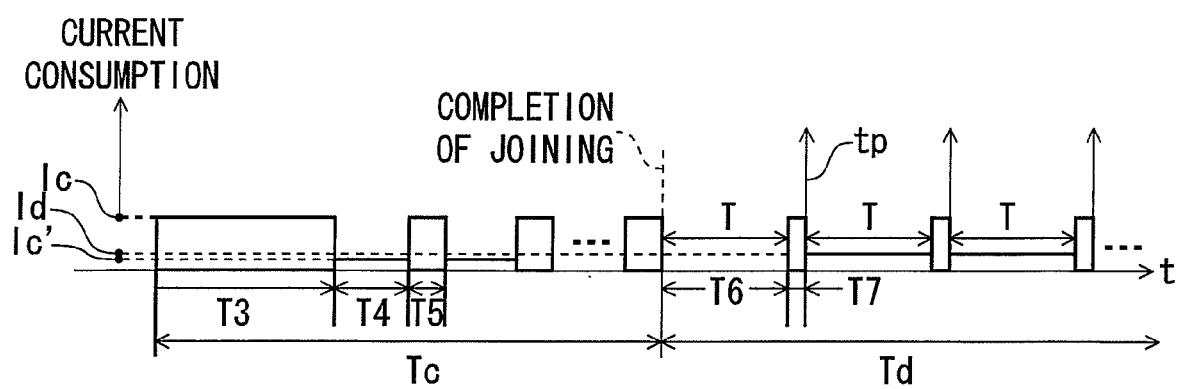
FIG. 2 is a graph showing an example current consumption characteristic of the field device 20 of FIG. 1 before and after joining in a wireless network.
Figure 9:
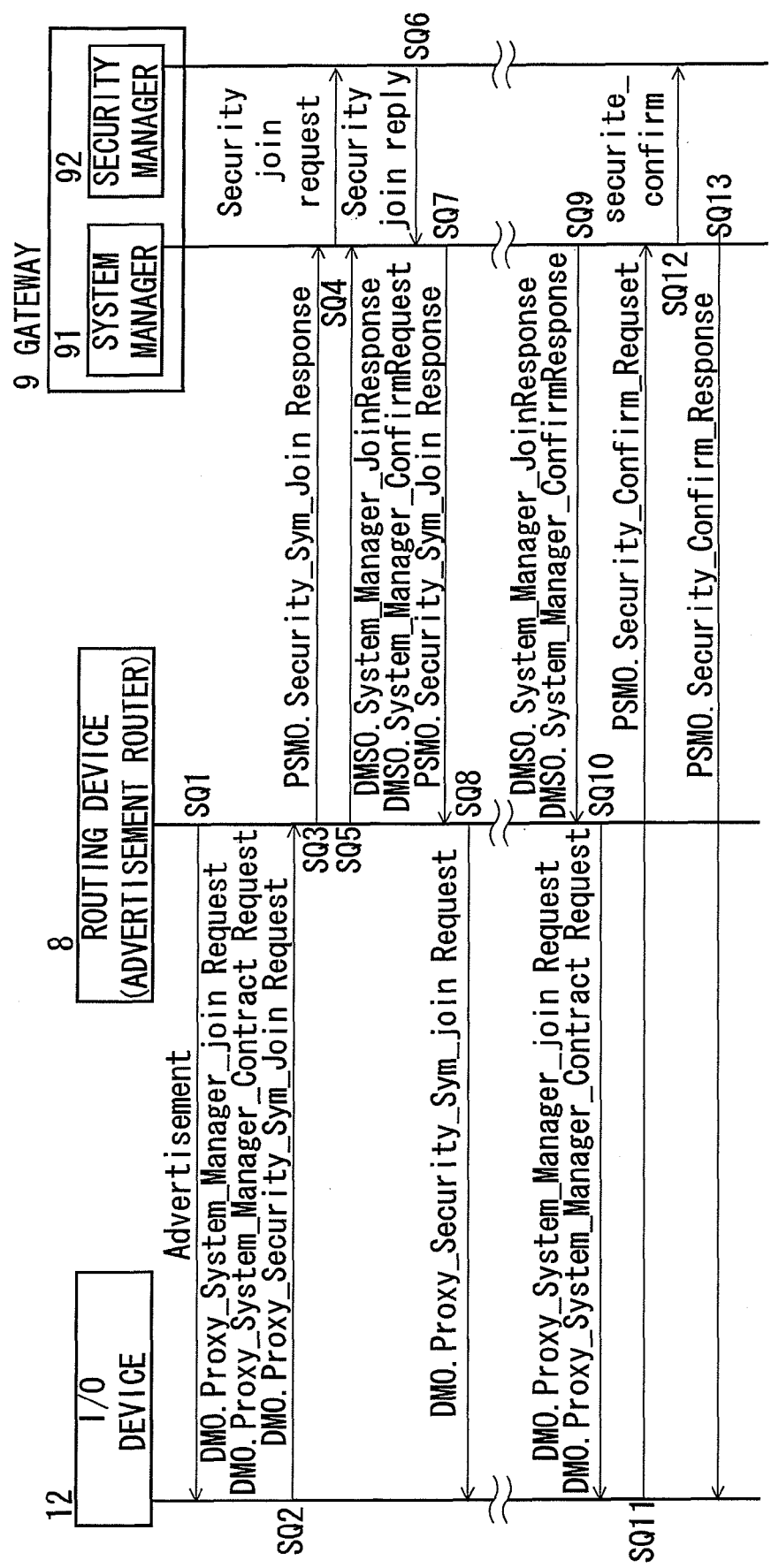
FIG. 9 is a sequence diagram which allows an I/O device 12 to join a wireless network topology 1 in the wireless network of FIG. 8.

FIG. 2 is a graph showing an example current consumption characteristic of the field device 20 of FIG. 1 before and after joining in a wireless network. The horizontal axis represents time and the vertical axis represents the current consumption. The sequence process of FIG. 9 is executed in a period Tc that is from power-on of the field device 20 to completion of joining (indicated by a broken line). In the period Tc, as long as the field device 20 is operational, the field device 20 receives signals successively and hence the current consumption has a large value Ic.

Figure 10:
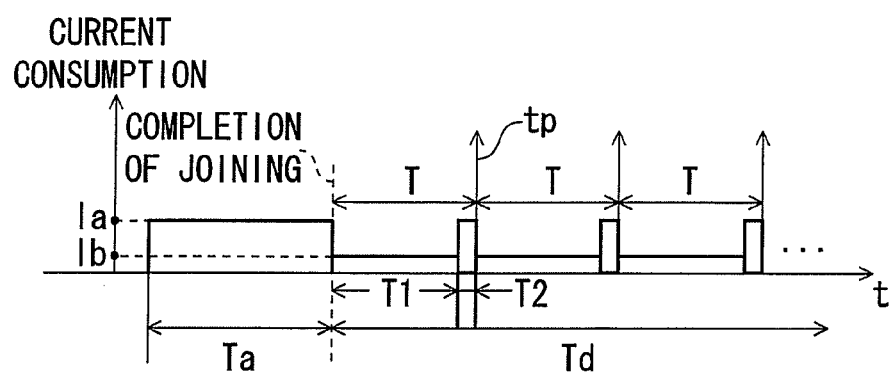
FIG. 10 is a graph showing an example current consumption characteristic of the I/O device 12 before and after joining in the wireless network topology 1.

As in the period Tb shown in FIG. 10, in a period Td that starts from the completion of joining, the field device 20 is activated at a constant cycle T, that is, only when it is necessary to send process data. The field device 20 repeats a cycle of calculating and sending process data and then being kept inactive until the next calculation and sending of process data. In a period T6 of each cycle T, the I/O device 12 is kept inactive and the current consumption has a small value Id (<Ic). In the other period T7, the field device 20 is operational to send process data. Each arrow denoted by symbol tp indicates that the field device 20 is sending process data to the gateway 9 by a wireless communication.

If the field device 20 has not joined the wireless network even after a lapse of a prescribed time T3 from the start of the period Tc, the MPU 23 renders the wireless communication module 22 inactive. The prescribed time T3 can be changed by the user using the infrared transceiver 30, for example, in a range of one week to one month, for example, according to an installation plan of the gateway 9. If necessary, the prescribed time T3 may be set at about 8 to 24 hours.

In a period T4, the infrared communication unit 27 is kept inactive and the current consumption is reduced to Ic' because no receiving operation is performed. However, the field device 20 cannot join the wireless network because it cannot receive an advertisement from the routing device 7 or 8 or the gateway 9. The length of the period T4 is about 1 hour and can be changed by the user.

A period T5 is a period which starts after the period T4 and in which the wireless communication module 22 is made operational again by the MPU 23. In the period T5, the wireless communication module 22 waits for reception of an advertisement. In the period T5, the current consumption has the large value Ic as in the period T3. The length of the period T5 is about 5 to 10 minutes and can be changed by the user. If the wireless communication module 22 cannot receive an advertisement in the period T5, the MPU 23 again renders the wireless communication module 22 inactive.

If the gateway 9 is installed and starts to operate sometime in the period Tc, the field device 20 repeats the cycle consisting of the periods T4 and T5 until the wireless communication module 22 receives an advertisement. When the wireless communication module 22 has received an advertisement, the period Tc is finished and the period Td is started which is the same as the period Tb of the conventional example shown in FIG. 10.

Figure 3:
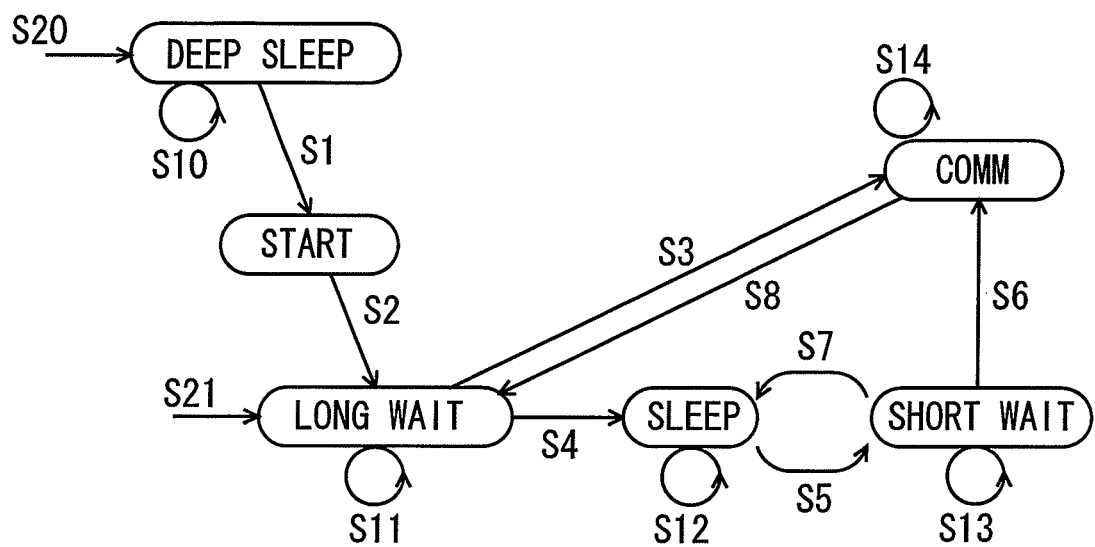
FIG. 3 is a state transition diagram of the field device 20.

FIG. 3 is a state transition diagram of the field device 20. FIG. 4 explains the details of the states shown in FIG. 3. FIG. 5 explains the details of the state transitions shown in FIG. 3.

In FIGS. 3-5, "deep sleep" indicates a state that the entire field device 20 is inactive. The MPU 23 is in a standby state and can be activated by an external interrupt signal that is supplied from the power management unit 25.

"Start" is a state that the field device 20 is performing activation processing. "Long wait" corresponds to the advertisement waiting period T3 (see FIG. 2) during which to join the wireless network.

"Sleep" is a state that the wireless communication module 22 is inactive because the field device 20 could not join the wireless network while it was in the "long wait" state. This state corresponds to the period T4 of the period Tc (see FIG. 2).

"Short wait" is a state that the wireless communication module 22 is active and hence can receive an advertisement. This state lasts only the short time T5 after the "sleep" state.

"Comm" is a state that the field device 20 is making a communication after joining the wireless network. This state corresponds to the period Td (see FIG. 2).

Symbol S1 denotes a transition from "deep sleep" to "start." The field device 20 is activated by insertion of the battery 26 or an event that the infrared communication unit 27 receives an infrared signal from the infrared transceiver 30 and supplies it to the power management unit 25.

Symbol S2 denotes a transition from "start" to "long wait." A timer for management of the period T3 is started upon completion of the field device activation processing.

Symbol S3 denotes a transition from "long wait" to "comm." The wireless communication module 22 receives an advertisement, whereupon it performs processing for joining the wireless network.

Symbol S4 denotes a transition from "long wait" to "sleep." The wireless communication module 22 does not receive an advertisement within the setting time of the timer for management of the period T3. The wireless communication module 22 is rendered inactive and a timer for management of the period T4 is started.

Symbol S5 denotes a transition from "sleep" to "short wait." The setting time of the timer for management of the period T4 expires, whereupon a timer for management of the period T5 is started and the wireless communication module 22 is activated.

Symbol S6 denotes a transition from "short wait" to "comm." The wireless communication module 22 receives an advertisement, whereupon it performs processing for joining the wireless network.

Symbol S7 denotes a transition from "short wait" to "sleep." The wireless communication module 22 does not receive an advertisement within the setting time of the timer for management of the period T5. The wireless communication module 22 is rendered inactive and the timer for management of the period T4 is started.

Symbol S8 denotes a transition from "comm" to "long wait." The wireless communication module 22 determines that the field device 20 has left the wireless network, whereupon a timer for management of the period T3 is started.

Symbol S10 denotes continuation of "deep sleep." The battery 26 is kept removed and the infrared communication unit 27 receives no infrared signal from the infrared transceiver 30.

Symbol S11 denotes continuation of "long wait." The wireless communication module 22 does not receive an advertisement and the timer for management of the period T3 is doing a counting operation.

Symbol S12 denotes continuation of "sleep." The timer for management of the period T4 is doing a counting operation.

Symbol S13 denotes continuation of "short wait." The wireless communication module 22 does not receive an advertisement and the timer for management of the period T5 is doing a counting operation.

Symbol S14 denotes continuation of the state "comm" in which the field device 20 belongs to the wireless network. The MPU 23 performs prescribed calculation processing and the wireless communication module 22 sends process data to the gateway 9 at transmission timing.

Symbol S20 denotes a transition from a certain indefinite state to "deep sleep." The battery 26 is removed in a certain indefinite state, the entire field device 20 is rendered inactive.

Symbol S21 denotes a transition from "sleep" or "short wait" to "long wait." The infrared communication unit 27 receives an infrared signal from the infrared transceiver 30 in the state "sleep" or "short wait," whereupon the timer for management of the period T3 is started.

As described above, if the wireless communication module 22 has not received an advertisement in the prescribed period T3 which is part of the period Tc, the cycle that the wireless communication module 22 is kept in active for the prescribed time T4 and then kept operational for the prescribed time T5 is repeated. As a result, the energy consumption of the battery 26 can be saved and the field device 20 can be added to the wireless network automatically after installation of the gateway 9 without the need for turning on the power switch by opening the lid of the field device 20 installed at a certain site.

Incidentally, in actual plants, a wireless network is in many cases constructed by installing many field devices. Assume a case that the gateway 9 was disconnected from the wireless network topology 1 temporarily for inspection or replacement work and then connected to the wireless network topology 1 again. In this case, if the wireless communication modules provided in the respective field devices are activated at approximately the same time points, accesses from a large number of field devices to the gateway 9 are concentrated. This may result in a situation that the gateway 9 cannot deal with those accesses it its processing ability is insufficient and a considerable number of field devices are rendered in a sleep state. A long time may be taken until complete recovery of the wireless network.

One countermeasure is to deviate (distribute) the activation times of the wireless communication modules provided in the respective field devices from each other by a very small time and thereby prevent access concentration to the gateway 9.

Figure 6:
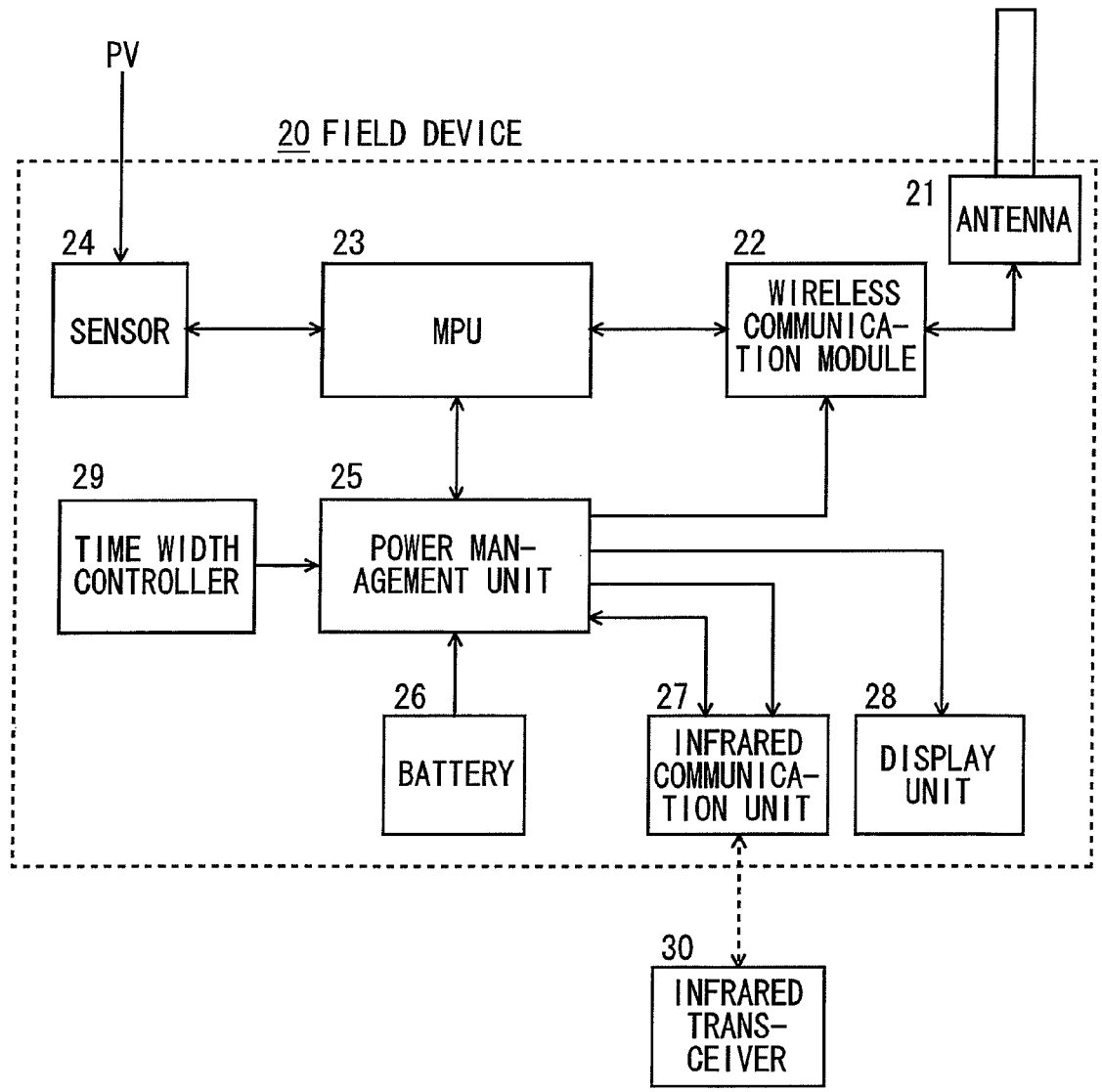
FIG. 6 is a block diagram of a wireless field device 20A according to another embodiment of the invention.

FIG. 6 is a block diagram of a wireless field device 20A according to another embodiment of the invention, which takes care of such a countermeasure. The units having the same or corresponding ones in FIG. 1 are given the same reference symbols as the latter. As shown in FIG. 6, a time width controller 29 is connected to the power management unit 25. The time width controller 29 sets unique, prescribed delays to the respective field device 20A as for operations that the power management units 25 suspend the supply of power to the wireless communication modules 22 according to signals received from the MPU 23. Although in FIG. 6 the time width controller 29 is an independent function block, it may be incorporated in the MPU 23 or the power management unit 25.

Figure 7:
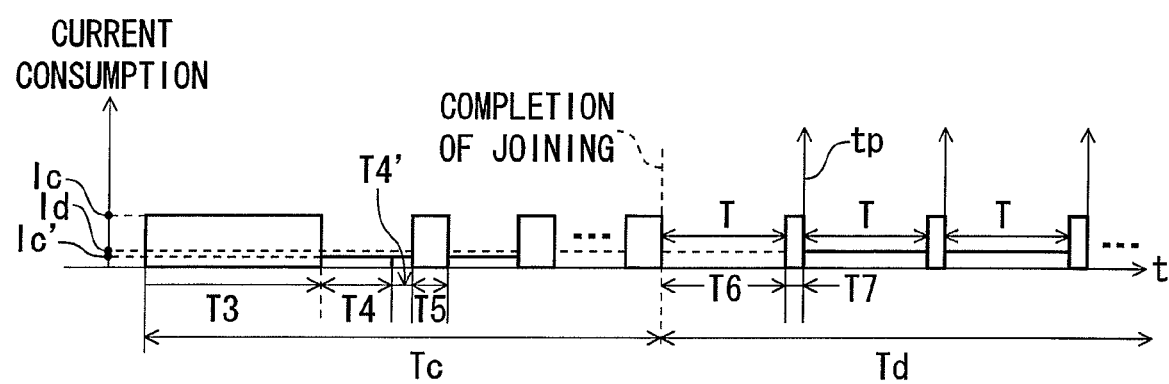
FIG. 7 is a graph showing an example current consumption characteristic of the field device 20A of FIG. 6 before and after joining in a wireless network.

FIG. 7 is a graph showing an example current consumption characteristic of the field device 20A of FIG. 6 before and after joining in a wireless network. Periods and current consumption values having corresponding ones in FIG. 2 are given the same reference symbols as the latter. The characteristic of FIG. 7 is different from that of FIG. 2 in that a prescribed time width T4' which is set by the time width controller 29 so as to be unique to each field device 20A is inserted between the period T4 in which the wireless communication module 22 is rendered inactive and the period T5 in which the wireless communication module 22 is made operational again.

The time width T4' is about 10% of the time width T4 and is calculated by the time width controller 29 according to the following Equation (1):

$$T4' = \frac{0.1T4}{63}(A_{EUI64} MOD 63) \quad (1)$$

where MOD represents a remainder and $A_{EUI64}$ has a value that is determined according to an EUI-64 address of the field device 20A. $A_{EUI64}$ may be the EUI-64 address itself. Alternatively, to increase the processing speed, $A_{EUI64}$ may be the sum of the lowest 4-byte words of the EUI-64 address that are given by the following Equation (2).

Figure 8:
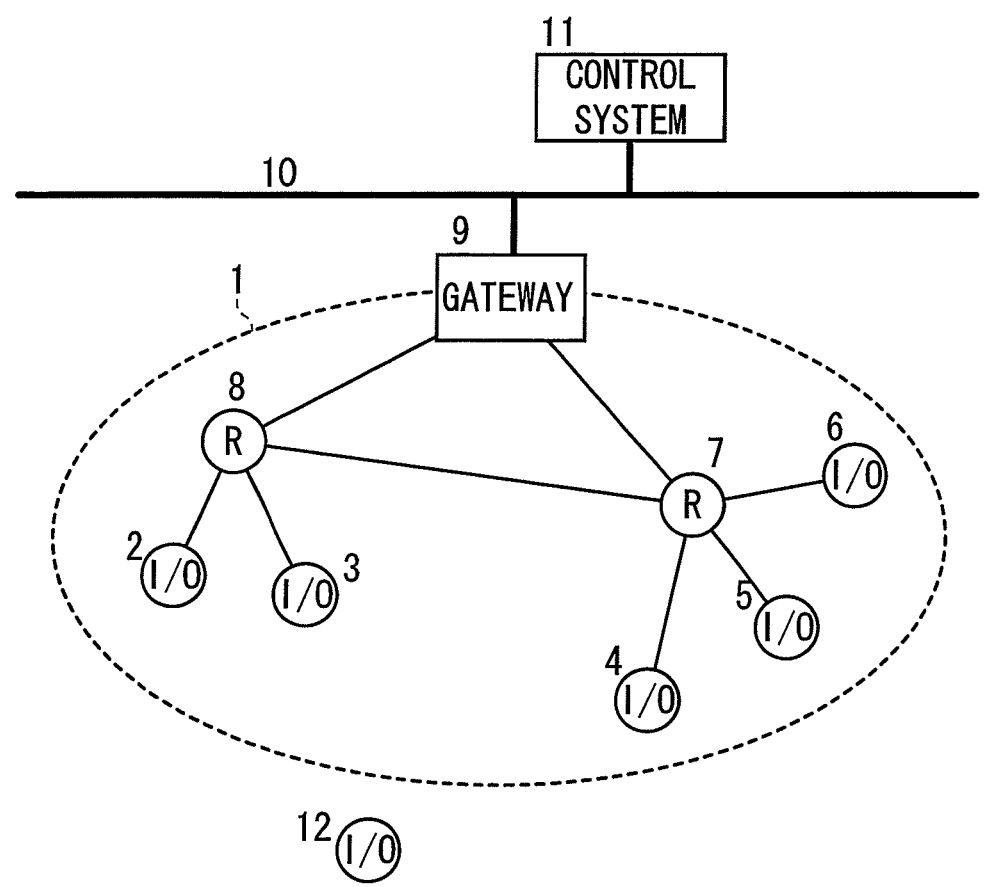
FIG. 8 shows the system configuration of an example wireless network using wireless field devices.

The I/O devices 2-6 and 12 shown in FIG. 8 are given respective IEEE EUI-64 bit addresses. The EUI-64 bit address is a 64-bit address which was standardized by IEEE and serves to uniquely identify a device. The upper 24 bits represent a number that is uniquely assigned to a manufacturer. As for the remaining, lower 40 bits, different numbers are assigned to respective devices by the manufacturer.

$$A_{EUI64} = B_3 + B_2 + B_1 + B_0 \quad (2)$$

where $B_0$, $B_1$, $B_2$, and $B_3$ are the values of the lowest byte, the second lowest byte, the third lowest byte, and the fourth lowest byte, respectively, of the EUI-64 address of the field device 20A.

Since as described above different time widths T4' that are set by the time width controller 29 for respective field devices 20A are added to the time width T4, different suspension times are set for the respective field devices 20A. As a result, the I/O devices 2-6 and 12 shown in FIG. 8 are activated at different time points.

Concentration of accesses from the I/O devices 2-6 and 12 to the gateway 9 can be prevented, whereby the load of the gateway 9 can be reduced (distributed).

Alternatively, a time width T3' which is given by the following Equation (3) may be added to the time width T3. This provides the same advantage as in the case that the time width T4' is added to the time width T4.

$$T3' = \frac{0.1T4}{63}(A_{EUI64} MOD 63) \quad (3)$$

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A wireless field device that performs a wireless communication with other field devices in a wireless network through a gateway, the device comprising:
   a battery incorporated in the field device to activate the field device; and
   a wireless communicator configured to exchange radio signals with the gateway to perform the wireless communication with said other field devices,
   wherein when the field device starts a procedure for joining in the wireless network, firstly, the wireless communicator continuously attempts to access the gateway in a first period in order to receive an advertisement signal from the gateway, and
   when the wireless communicator cannot access the gateway and receive the advertisement signal in the first period, the wireless communicator intermittently attempts to access the gateway until receiving the advertisement signal from the gateway,
   wherein when the wireless communicator cannot access the gateway and receive the advertisement signal from the gateway in the first period, the wireless communicator is made inactive in a second period and then the wireless communicator is made active in a third period,
   wherein the second period and the third period are alternately repeated until the wireless communicator receives the advertisement signal from the gateway,
   wherein the wireless communicator is activated by a current that is more than a threshold current, the current being generated from the battery, and
   wherein a current supplied to the wireless communicator is less than the threshold current in the second period, and a current supplied to the wireless communicator is more than the threshold current in the third period.

2. A wireless field device that performs a wireless communication with other field devices in a wireless network through a gateway, the device comprising:

a battery incorporated in the field device to activate the field device; and a wireless communicator configured to exchange radio signals with the gateway to perform the wireless communication with said other field devices, wherein when the field device starts a procedure for joining in the wireless network, firstly, the wireless communicator continuously attempts to access the gateway in a first period in order to receive an advertisement signal from the gateway, and when the wireless communicator cannot access the gateway and receive the advertisement signal in the first period, the wireless communicator intermittently attempts to access the gateway until receiving the advertisement signal from the gateway, wherein when the wireless communicator cannot access the gateway and receive the advertisement signal from the gateway in the first period, the wireless communicator is made inactive in a second period and then the wireless communicator is made active in a third period, wherein the second period and the third period are alternately repeated until the wireless communicator receives the advertisement signal from the gateway, and wherein if there are a plurality of wireless devices that start the procedure for joining in the wireless network, start points of the third period are different for each of the plurality of wireless devices.

3. The device of claim 2, wherein the start points of the third period are set based on unique addresses assigned to the plurality of wireless devices.

\* \* \* \* \*